H. LEWIS.
HARROW.
APPLICATION FILED OCT. 6, 1917.

1,287,363.

Patented Dec. 10, 1918.
2 SHEETS—SHEET 1.

Witness
L. B. James
J. W. Garner

Inventor
Harry Lewis
By Victor J. Evans
Attorney

H. LEWIS.
HARROW.
APPLICATION FILED OCT. 6, 1917.
1,287,363.
Patented Dec. 10, 1918.
2 SHEETS—SHEET 2.
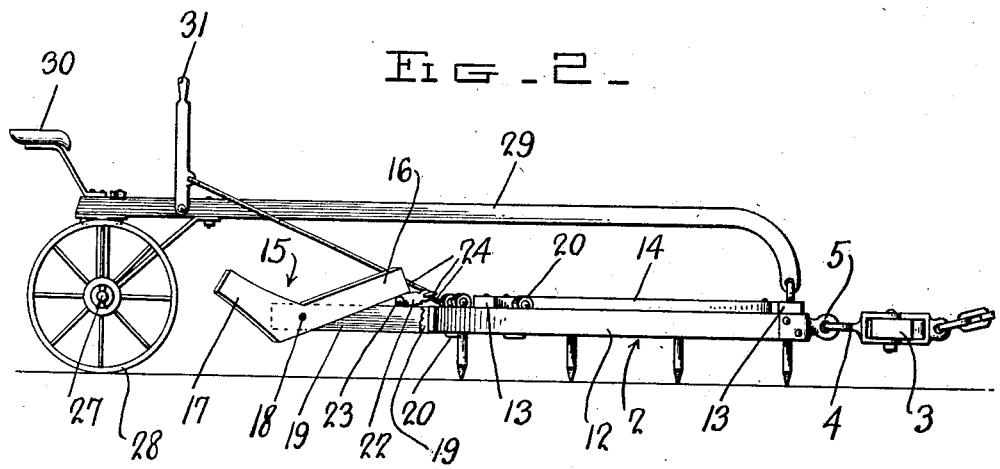
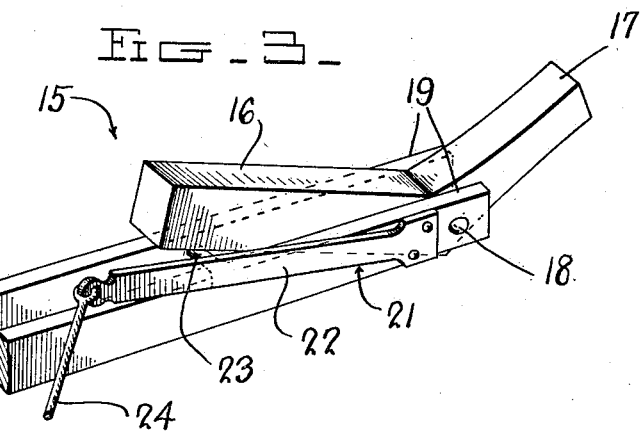
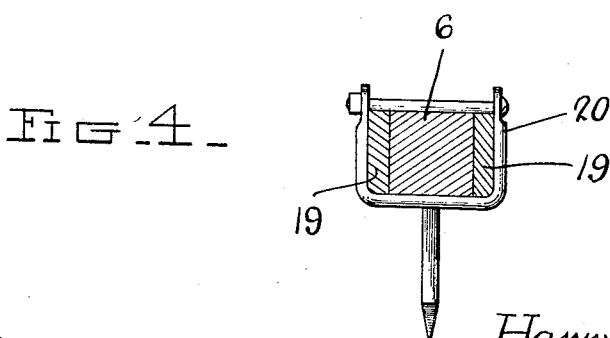
Inventor
Harry Lewis
By Victor J. Evans
Attorney
Witness
L. B. James
J. W. Garner

UNITED STATES PATENT OFFICE.

HARRY LEWIS, OF FERNEY, SOUTH DAKOTA, ASSIGNOR OF ONE-HALF TO FRANK H. HECKERT, OF FERNEY, SOUTH DAKOTA.

HARROW.

1,287,363.  Specification of Letters Patent.  Patented Dec. 10, 1918.

Application filed October 6, 1917. Serial No. 195,108.

*To all whom it may concern:*

Be it known that I, HARRY LEWIS, a citizen of the United States, residing at Ferney, in the county of Brown and State of South Dakota, have invented new and useful Improvements in Harrows, of which the following is a specification.

This invention relates to improvements in harrows and especially with reference to the provision of means for raising the rear portion of a harrow from the ground while the same is in operation, for the purpose of discharging trash and other obstructions from the harrow teeth and without the necessity of taking hold of the harrow.

The object of the invention is to provide improved lifting means of this character which are simple in construction, which may be readily attached to any ordinary harrow, and which are operated by engagement with the ground and by the forward movement of the harrow.

The invention consists in the construction, combination and arrangement of devices hereinafter described and claimed.

In the accompanying drawings:—

Fig. 2 is an elevation of the same, partly in section on the plane indicated by the line 2—2 of Fig. 1.

Figs. 3 and 4 are detailed views.

Figure 1:
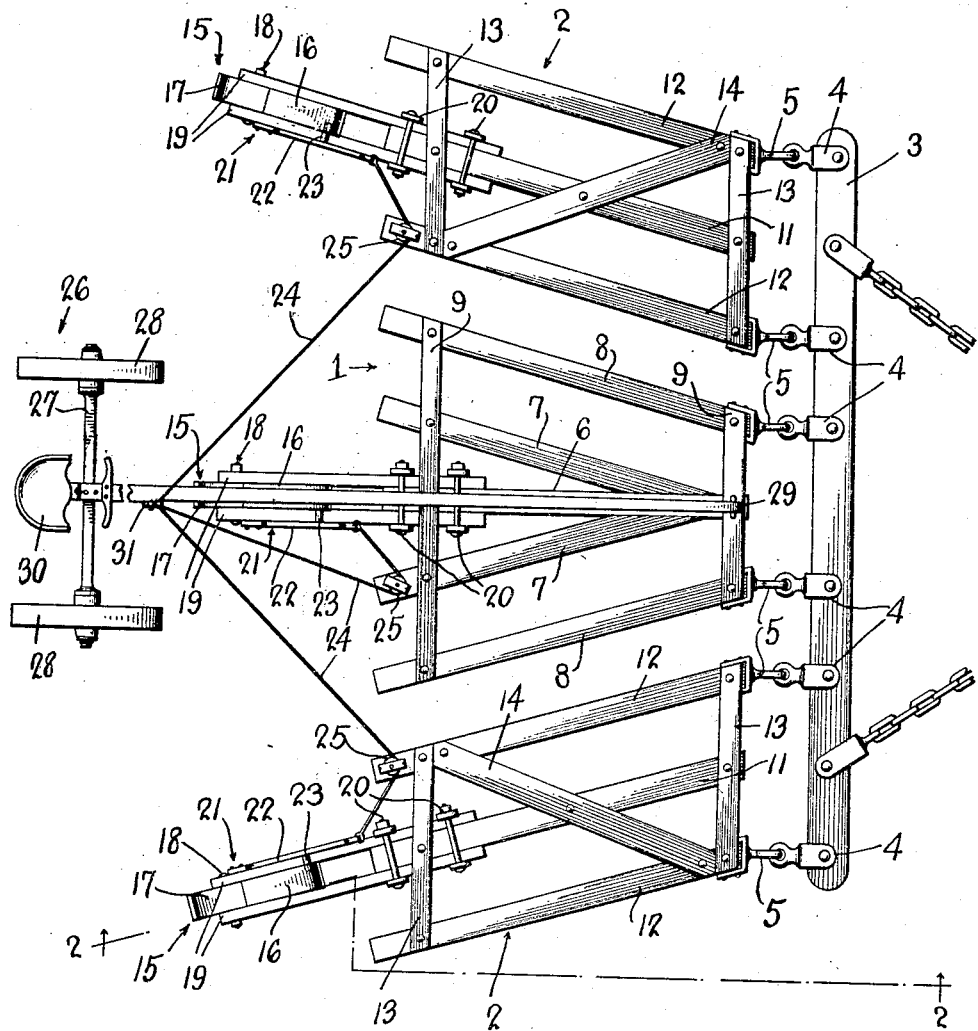
Figure 1 is a plan of a sectional harrow provided with harrow section lifting means constructed and arranged in accordance with my invention.

The harrow is here shown as comprising a center or middle section 1 and side sections 2, the said sections being flexibly connected to a draft or evener bar 3. The bar is here shown as provided with draft clips 4 on its rear side and the harrow sections are shown provided at the front ends with hooks 5 which loosely engage the draft clips so that the harrow sections are connected to the draft bar for vertical movement and each harrow section may be lifted independently of the others.

The center harrow section comprises a centrally arranged bar 6, rearwardly diverging bars 7 secured at their front ends on opposite sides of the center bar; outer bars 8 which are parallel with the bars 7, and cross bars 9 which are attached to the center bar and to which the outer bars are bolted as shown.

Each side section 2 comprises a center bar 11, outer bars 12, cross bars 13 and a brace bar 14. The bars 11, 12 of each outer harrow section are arranged obliquely with respect to the line of draft and parallel with the similarly arranged bars of the center section. The harrow may be of any suitable construction and may be provided with any suitable number of sections within the scope of my invention.

Each harrow section is provided at the rear end with a lifting device 15. Said lifting device comprises, in the embodiment of the invention here shown, arms 16, 17 which are arranged at an angle with respect to each other and which are of unequal length, the arm 16 being the longer. Each lifting device is pivotally mounted as by means of a bolt 18 between the rear ends of a pair of bars 19 which extend rearwardly from the center bar of one of the harrow sections and which are secured to said harrow bar by means of clip bolts 20. Hence each lifting device is mounted for rotation by engagement with the ground and by the forward movement of the harrow.

Associated with each lifting device is a stop 21 which is here shown as comprising a spring bar 22 and a stop arm 23. Each spring bar is secured near its rear end on one side of one of the bars 19 and its stop arm, which is arranged near the front end of the spring bar, extends transversely over said bar 19 and into the path of the longer arm 16 of the lifting device so that the stop arm is normally held by the spring bar in engaged position with the longer arm of the lifting device and hence the lifting device is normally prevented from turning. The pivots 18 on which the lifting devices are mounted are arranged in the angles between the arms of the lifting device.

A trip cord 24 is attached to each spring arm, passes around a direction pulley 25 mounted on the harrow section and leads to the driver so that the driver by pulling on a trip cord may cause the spring bar to which the cord is attached to be moved laterally at its free end to disengage the stop arm 23 from the longer arm of the lifting device, whereupon the said arm will by its own weight drop to and engage with the ground and thereupon the said movement of the harrow will cause the lifting device to turn and in so doing lift the rear end of the harrow, clear the teeth thereof from trash, and then drop the harrow again to the ground, the shorter arm 17 of the lifting device clearing the stop arm 23 and hence the lifting device will make a complete revolution and its longer arm will be again caught by the stop arm 23 and held until the trip cord is again pulled for a like purpose.

I here show the harrow provided with a truck 26 arranged in rear of the center harrow section and comprising an axle 27, ground wheels 28, a pole 29 and a seat 30 for the driver. The front end of the pole is downwardly turned and pivotally connected to the front portion of the center harrow section so that the pole permits free lifting movement of said harrow section. A lever 31 is here shown as pivotally mounted on the pole of the truck and the trip cords are shown attached to said lever. Hence by moving the lever the driver can simultaneously operate all of the stop devices and cause the lifting devices to be simultaneously operated.

While I have herein shown and described a preferred form of my invention, I would have it understood that changes may be made in the form, proportion and construction of the several parts, without departing from the spirit of my invention and within the scope of the appended claims.

Having thus described my invention, I claim:—

1. In combination with a harrow having a bar, a lifting attachment comprising a pair of bars secured to and extending from one end of said harrow bar and arranged in spaced relation to each other, and a lifting device pivotally mounted between the said spaced bars, said lifting device comprising a pair of arms of unequal length arranged at an angle to each other, a movable stop arranged to bear under the longer arm of said lifting device, said stop being arranged at a point spaced from the pivot of the lifting device and the distance between said stop and said pivot exceeding the length of said shorter arm of the lifting device, and means to move said stop out of engagement with said lifting device to permit the latter to turn.

2. In combination with a harrow having a bar, a lifting attachment comprising a pair of bars secured to and extending from one end of said harrow bar and arranged in spaced relation to each other, and a lifting device pivotally mounted between the said spaced bars, said lifting device comprising a pair of arms of unequal length arranged at an angle to each other, a movable stop arranged to bear under the longer arm of said lifting device, said stop being arranged at a point spaced from the pivot of the lifting device and the distance between said stop and said pivot exceeding the length of said shorter arm of the lifting device, and means to move said stop out of engagement with said lifting device to permit the latter to turn, said stop moving means comprising a spring arm to which said stop is attached, said spring arm being also attached to one of said spaced bars and an operating cord attached to said spring arm.

In testimony whereof I affix my signature.

HARRY LEWIS.

Copies of this patent may be obtained for five cents each, by addressing the "Commissioner of Patents, Washington, D. C."